(12) United States Patent
Arobbio et al.

(10) Patent No.: US 11,313,472 B2
(45) Date of Patent: Apr. 26, 2022

(54) INTEGRATED PROTECTION COMPONENT FOR A SEALING RING, IN PARTICULAR AN OIL SEAL RING FOR VEHICLE TRANSMISSION COMPONENTS AND ASSOCIATED SEALING SYSTEM

(71) Applicant: Aktiebolaget SKF, Gothenburg (SE)

(72) Inventors: Gianluca Arobbio, Asti (IT); Marco Bresso, Turin (IT); Fabio Marchisio, Castelnuovo don Bosco (IT); Alessandro Piras, Settimo-Tornise (IT)

(73) Assignee: Aktiebolaget SKF, Gothenburg (SE)

( * ) Notice: Subject to any disclaimer, the term of this patent is extended or adjusted under 35 U.S.C. 154(b) by 21 days.

(21) Appl. No.: 16/874,443

(22) Filed: May 14, 2020

(65) Prior Publication Data

US 2020/0393047 A1  Dec. 17, 2020

(30) Foreign Application Priority Data

Jun. 17, 2019 (IT) .......................... 102019000009177

(51) Int. Cl.
| | |
|---|---|
| *F16J 15/54* | (2006.01) |
| *F16H 57/023* | (2012.01) |
| *F16H 57/029* | (2012.01) |
| *F16H 57/04* | (2010.01) |
| *F16H 57/00* | (2012.01) |

(52) U.S. Cl.
CPC ............ *F16J 15/54* (2013.01); *F16H 57/023* (2013.01); *F16H 57/029* (2013.01); *F16H 57/0472* (2013.01); *F16H 57/0018* (2013.01)

(58) Field of Classification Search
CPC ...... F16J 15/3268; F16J 15/54; F16H 57/023; F16H 57/029; F16H 57/0472
See application file for complete search history.

(56) References Cited

U.S. PATENT DOCUMENTS

| | | | | |
|---|---|---|---|---|
| 4,815,884 | A * | 3/1989 | Halliday, Jr. ....... | B25B 27/0028 277/551 |
| 7,059,608 | B2 * | 6/2006 | Ramsay ................. | F16J 15/008 277/551 |
| 7,284,759 | B2 * | 10/2007 | Heldmann .......... | B25B 27/0028 277/351 |
| 7,651,102 | B2 | 1/2010 | Heldmann et al. | |

(Continued)

FOREIGN PATENT DOCUMENTS

EP  1798448 A1  6/2007

*Primary Examiner* — Thomas C Diaz
(74) *Attorney, Agent, or Firm* — Garcia-Zamor Intellectual Property Law; Ruy Garcia-Zamor; Bryan Peckjian

(57) ABSTRACT

An integrated protection component for a sealing ring and associated sealing system for a vehicle transmission component, including a plug that can be inserted inside the sealing ring and an annular element for protecting the sealing ring during insertion of a rotating shaft is provided. The annular element includes a flange-shaped end and a tubular side wall that directly comes into engaging contact with the sealing ring and receives inside it the rotating shaft. The first end being provided with a handle, the plug engaging in a removable manner with the annular element and the tubular side wall being provided with a first weakened zone formed longitudinally alongside a second, radially formed, weakened zone of the first end so as to break following a pulling force exerted manually on the handle.

16 Claims, 4 Drawing Sheets

(56) References Cited

U.S. PATENT DOCUMENTS

| | | |
|---|---|---|
| 8,292,302 B2 | 10/2012 | Heldmann et al. |
| 8,474,828 B2 | 7/2013 | Heldmann et al. |
| 8,783,133 B2 | 7/2014 | Pietras |
| 8,910,948 B2 | 12/2014 | Heldmann et al. |
| 2011/0185844 A1 | 8/2011 | Pietras |
| 2013/0256995 A1 | 10/2013 | Heldmann et al. |

* cited by examiner

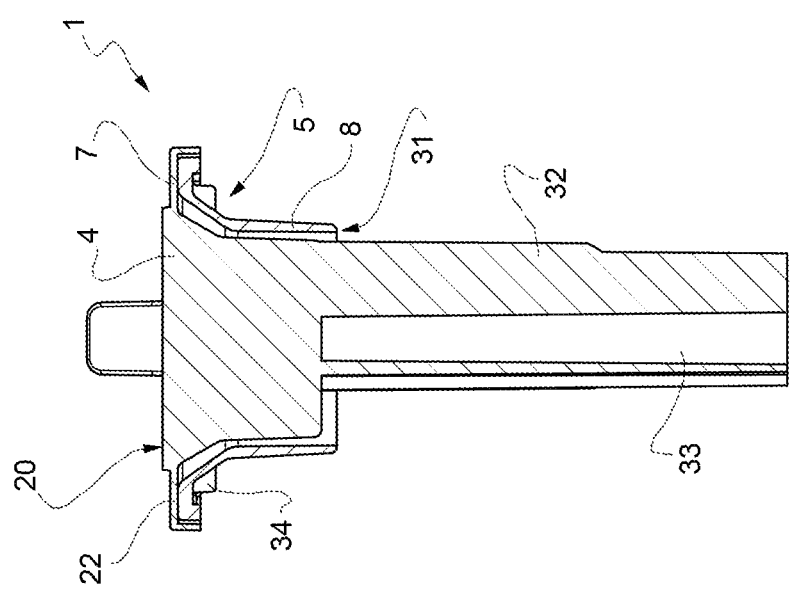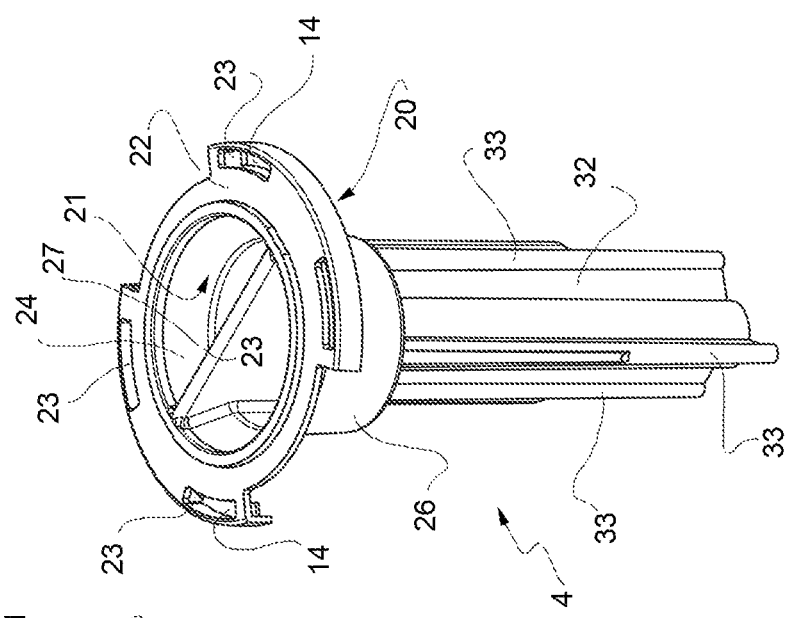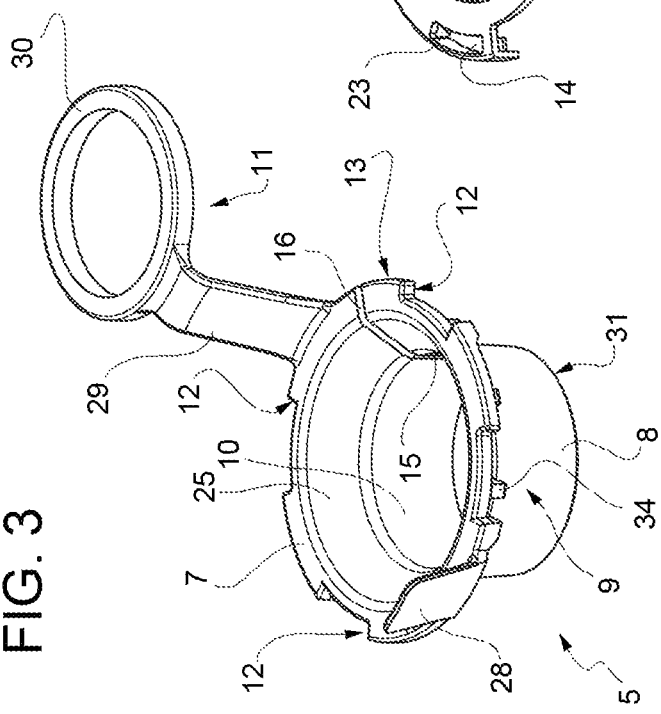

INTEGRATED PROTECTION COMPONENT FOR A SEALING RING, IN PARTICULAR AN OIL SEAL RING FOR VEHICLE TRANSMISSION COMPONENTS AND ASSOCIATED SEALING SYSTEM

CROSS-REFERENCE TO RELATED APPLICATIONS

This application claims priority to Italian Patent Application no. 102019000009177, filed Jun. 17, 2019, the contents of which is fully incorporated herein by reference.

FIELD OF THE INVENTION

The present invention relates to an integrated component comprising a protection plug and assembly device intended to protect a sealing ring, in particular an oil seal ring for vehicle transmission components during assembly of a shaft inside the sealing ring, and to close the through-opening for the shaft before assembly thereof, with retention of the shaft inside the sealing ring, in order to prevent the entry of external contaminants inside the transmission component through the opening.

BACKGROUND OF THE INVENTION

As is known, in the movement transmission components of vehicles, in particular in the case of the differential device, during assembly of the vehicle transmission a rotating shaft must be inserted through an opening of the transmission component provided with a sealing ring which, at the time of assembly, engages with the shaft so as to prevent oil or grease escaping from the component and the entry inside it of any external contaminants.

Before assembly of the shaft, however, some contaminants may enter into the component. In order to avoid this risk, the through-opening, which is already provided with the sealing ring, is closed by a plug. However, both this plug, and in particular the shaft (usually a splined shaft) when assembled after removal of the plug, may cause damage or deformation of the lip or sealing lips of the sealing ring, which subsequently cause oil or grease to escape. This typically happens in the case of the shaft output seal of the vehicle differential.

It is known to use, in addition to the protection cover for preventing the entry of contaminants, for example inside the gearbox of vehicles during transportation and the movement towards the assembly line, also a PTFE ring mounted on the internal diameter of the sealing ring for guiding the transmission shaft, but this does not protect the main sealing lip of the seal from any damage.

Moreover, the assembly of two (or more) separate components, in addition to being costly, results in an excessive volume and assembly difficulties, and often is not even possible owing to the design constraints.

SUMMARY OF THE INVENTION

The object of the present invention is to provide an integrated protection component and an associated sealing system which are intended to protect a sealing ring, in particular an oil seal ring for vehicle transmission components, which are without the drawbacks of the present state of the art and which are at the same time reliable, inexpensive to produce and assemble and which protect effectively, on the one hand, the sealing ring from any damage and, on the other hand, prevent the entry of any contaminants into the transmission component.

On the basis of the invention, therefore, an integrated protection component and an associated sealing system for the protection of a sealing ring, in particular an oil seal ring for vehicle transmission components, having the characteristic features indicated in the attached claims, are provided.

BRIEF DESCRIPTION OF THE DRAWINGS

The invention will now be described with reference to the attached drawings which illustrate a non-limiting example of embodiment thereof, in which:

FIGS. 3 and 4 show in schematic form respective three-quarter perspective views, from above, of two different parts of the integrated component according to the invention;

FIG. 5 shows in schematic form an elevation view, cross-sectioned along a plane indicated by V-V, of the integrated component of the invention with its parts mounted on each other.

DETAILED DESCRIPTION OF THE INVENTION

Figure 1:
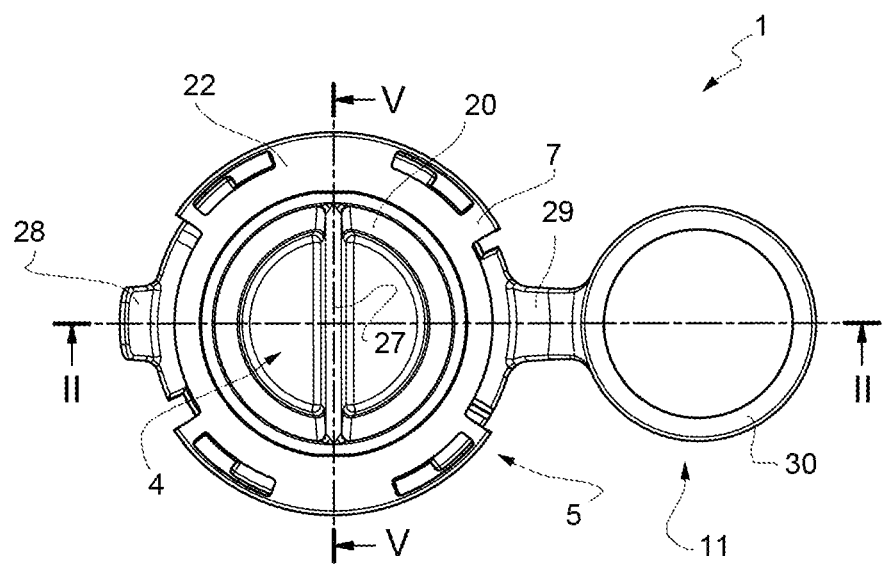
FIG. 1 shows in schematic form a top plan view of the integrated protection component according to the invention.
Figure 2:
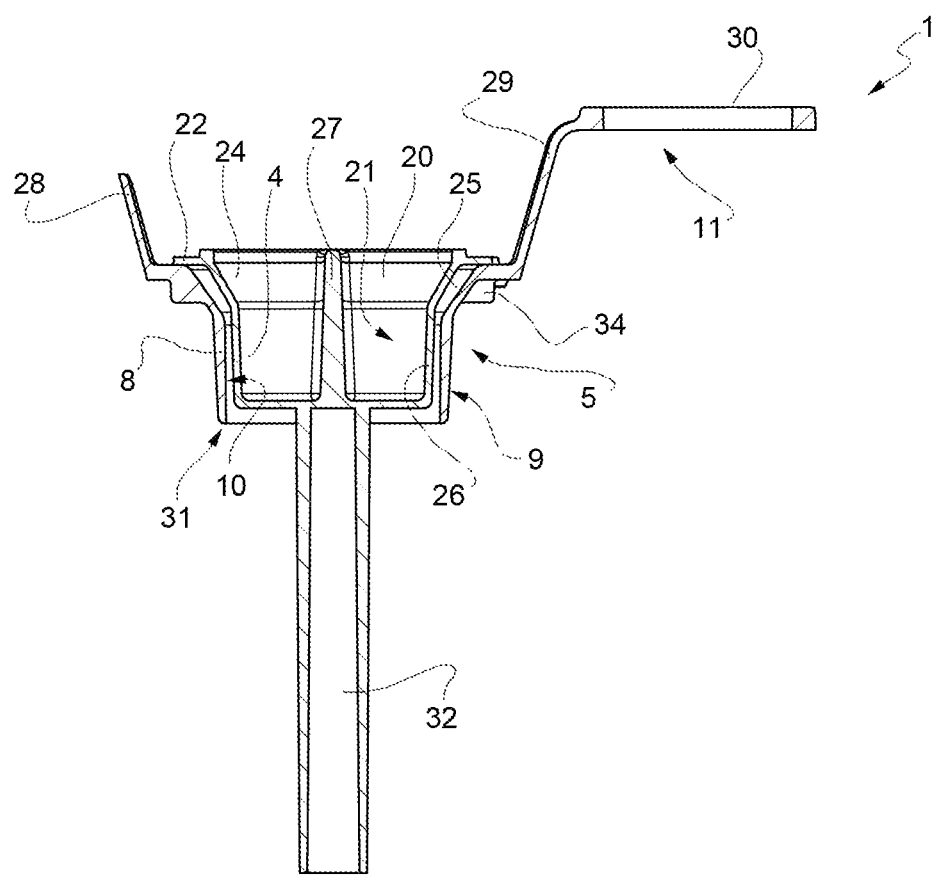
FIG. 2 shows in schematic form an elevation view, cross-sectioned along a plane II-II, of the integrated component according to FIG. 1.

With reference to FIGS. 1 to 5, in them 1 denotes in its entirety an integrated protection component for a sealing ring 2 (FIGS. 6a-6c) which, in the non-limiting, but preferred example of embodiment shown consists of an oil seal ring for a vehicle transmission component 3, for example a differential.

The integrated component 1 comprises a plug 4 configured to be inserted inside the sealing ring 2 (FIG. 6a) and an annular element 5 consisting of a protection cover configured to protect the sealing ring 2 during insertion, through it, of a shaft 6, typically a splined shaft, which rotates during use.

Figure 6A:
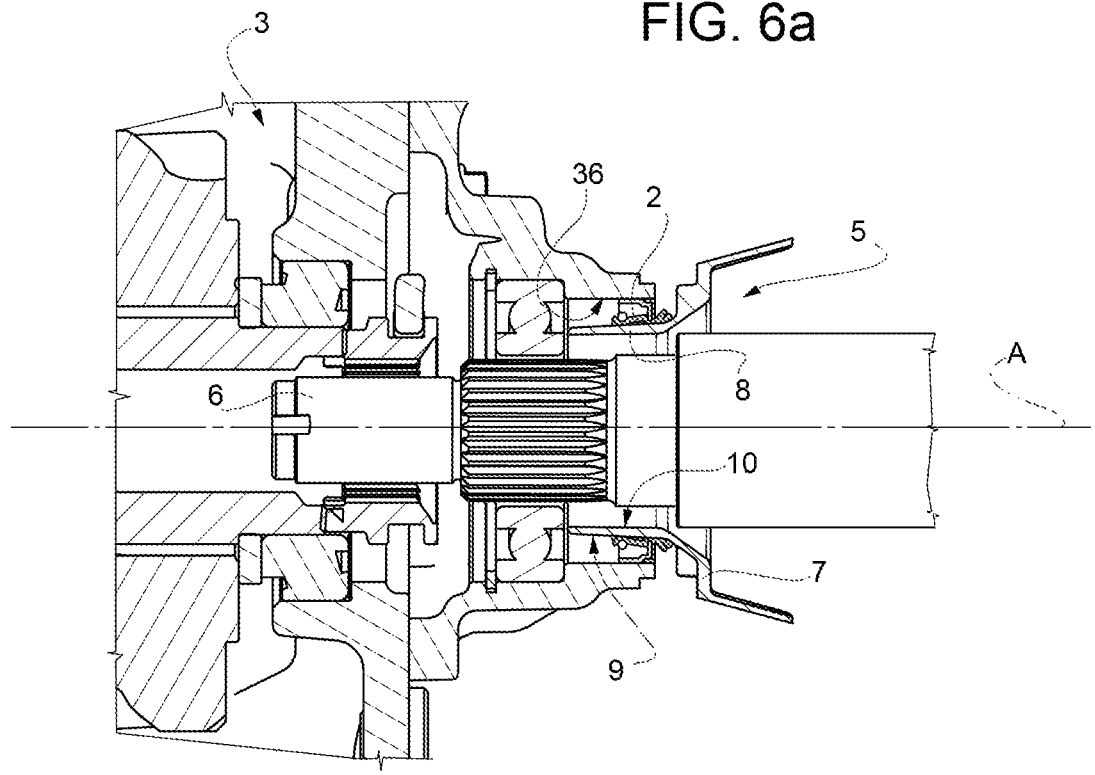
FIGS. 6a, 6b and 6c show in schematic form three successive steps for use of the integrated component according to the invention, together with the associated sealing system, on a vehicle transmission component, and removal therefrom.
Figure 6B:
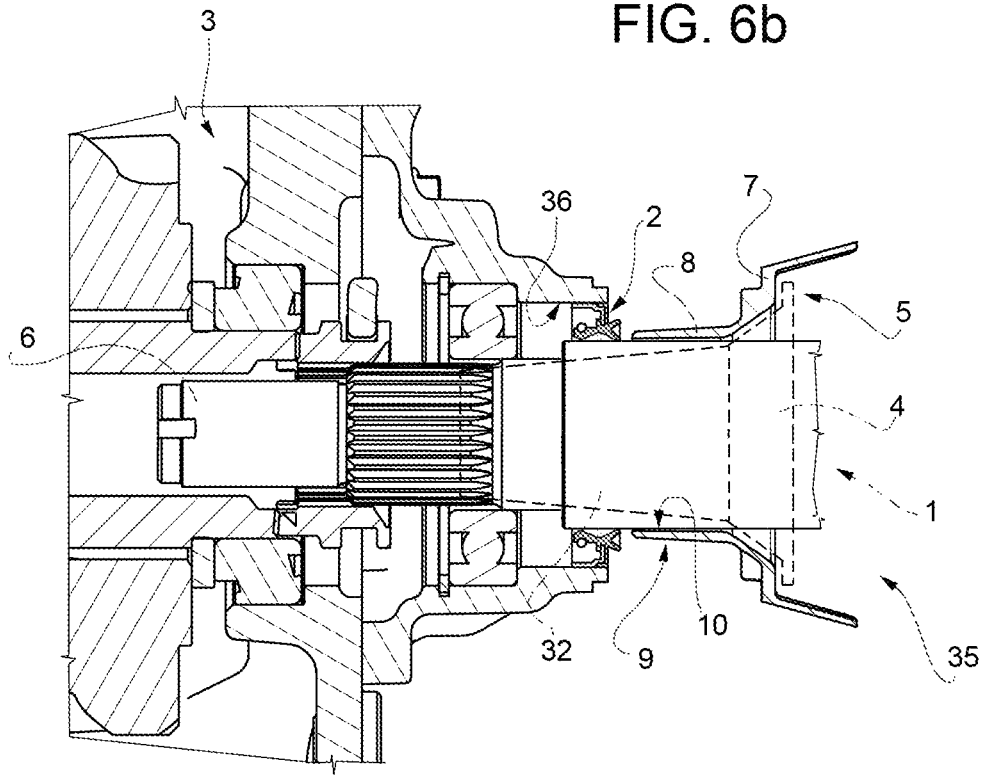

The annular element 5 (see FIGS. 1-3) comprises a first flange-shaped end 7 and a tubular side wall 8 which extends axially projecting from the first end 7 and is configured to engage during use, with its radially outer surface 9, directly in contact with the sealing ring 2 and to receive internally, along its radially inner surface 10, the rotating shaft 6 (FIG. 6b).

According to an aspect of the invention, the first flange-shaped end 7 is provided, radially on the outside and radially projecting, with at least one handle 11 and is configured to engage axially, during use, against the sealing ring 2 (FIG. 6a).

Moreover the plug 4 and the first flange-shaped end 7 are configured to engage together removably by means of a snap-engaging or bayonet joint, with the plug 4 arranged inside the annular element 5, the plug 4 being able to be inserted into the annular element 5 via the first flanged end 7.

In the preferred example of embodiment shown the joint between plug 4 and flanged end 7 is of the bayonet type, being realized by means circumferential recesses 12 which are formed through a radially outer edge 13 (FIG. 3) of the flanged end 7 and which are engaged by respective L-shaped teeth 14 of the plug 4 (FIG. 4), described in more detail below.

According to an essential aspect of the invention, the tubular side wall 8 is provided over the whole of its axial length (i.e. measured parallel to an axis A of symmetry of the shaft 6) with a first weakened zone 15 formed longitudinally alongside a second weakened zone 16, the latter however being formed radially on/in the first flange-shaped end 7.

Figure 6C:
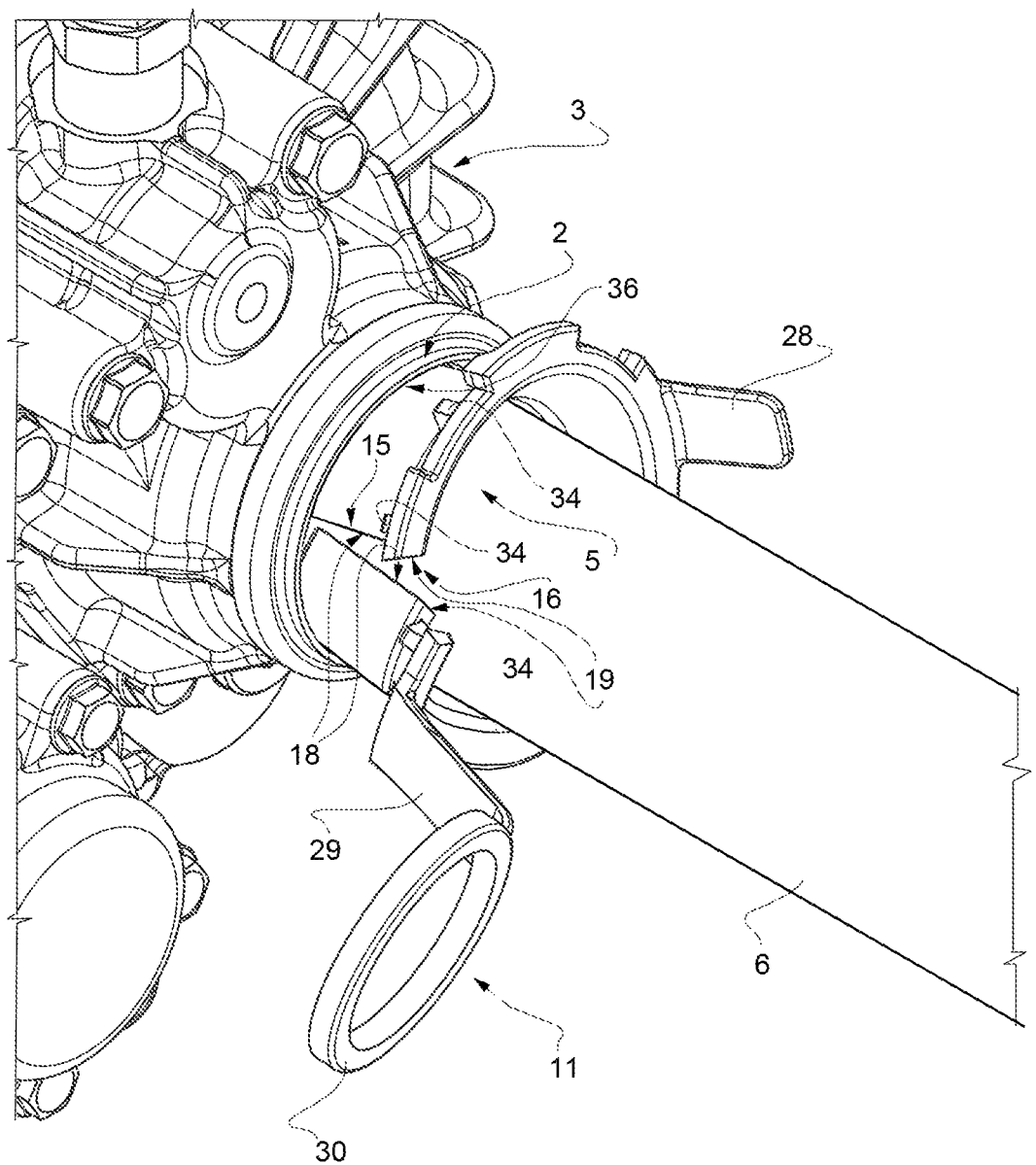

These weakened zones 15 and 16 are configured to separate/break following a pulling force exerted manually on the handle 11 so as to be able to cause, during use, at any moment, circumferential opening of the annular element 5 (FIG. 6c).

The annular element 5 is in fact made as one piece from a synthetic plastic material.

The first and the second weakened zones 15, 16 are defined on opposite, longitudinal, adjacent edges 18 of the tubular side wall 8 and radial edges 19 of the flange-shaped end 7 (FIG. 6c), which have been welded together, for example by means of ultrasound, in the case where the annular element or cover 5 has been obtained by means of pressing as a single piece, but in an open configuration. Or else they consist of longitudinal thinner portions (FIG. 3) of the flanged end 7 and radial portions of the tubular side wall 8 (obtained by suitably designing the mould) when the annular element 5 is obtained by means of pressing directly in the closed ring-shaped configuration for use.

The plug 4 is also preferably made as one piece from a synthetic plastic material and comprises a cup-shaped head 20 having a concavity 21 (FIGS. 2 and 4) directed on the opposite side to the annular element 5.

The head 20 is also provided radially on the outside and on the side where its concavity 21 is located with a flange 22 for engagement with the first flanged end 7 of the annular element 5.

The L-shaped teeth 14 are formed integrally with the flange 22 so as to be directed towards the annular element 5 and are located opposite circumferential through-slots 23 formed through the flange 22 so as to be able to press the teeth 14 without the formation of undercuts.

The head 20 of the plug 4 is delimited by a first section 24 of an annular side wall, which is frustoconically shaped and configured to engage with a frustoconically shaped opening 25 of the tubular side wall 8 of the annular element 5.

The head 20 of the plug 4 is also delimited by a second section 26 of the annular side wall, this having a cylindrical shape, being configured to engage with the radially inner side surface 10 of the tubular side wall 8 of the annular element 5.

The plug 4, inside the concavity 21 of the head 20, is provided with at least one gripping flange 27 for being able to rotate the plug 4 relative to the annular element 5. Preferably the head 20 includes a single flange 27 formed diametrically between the two side wall sections 24 and 26, formed integrally therewith, inside the concavity 21, so as to be able to be gripped manually by an operator, also when wearing a glove.

The first flange-shaped end 7 has, in addition to the handle 11 and again radially on the outside thereof and radially projecting, also a lug 28 formed in a position diametrically opposite to the handle 11 and configured to be gripped manually.

The handle 11 comprises a flexible tongue 29 formed integrally with the flanged end 7 and terminating in a manual gripping ring 30.

The radially outer side surface 9 of the tubular side wall 8 is conical, in particular frustoconical, and has a conicity directed towards a second end 31 of the annular element 5, opposite to the first end 7. Hereinbelow, "conicity" is understood as meaning the direction in which the conical surface converges towards the vertex of the ideal cone of which it forms part.

According to an aspect of the invention, the plug 4 is provided with an axial guide stem 32 which extends projecting from the annular element 5 and through the annular element 5, on the opposite side to the first flange-shaped end 7 of the annular element 5, and which is formed axially projecting from the head 20, on the opposite side to the flange 22.

The stem 32 is provided with a plurality of radial fins 33 and is configured to be inserted, during use, inside the transmission component 3, as schematically shown in broken lines in FIG. 6b.

Finally, the flange-shaped first end 7 of the annular element 5 is provided, on the side where the tubular side wall 8 is located, with a plurality of radial projections 34 which are spaced from each circumferentially and arranged annularly and which are configured to engage axially, during use, against the sealing ring 2.

From the description provided hitherto, finally, it is clear that the invention relates also to a sealing system, indicated overall by 35 (FIG. 6b) for a vehicle transmission component 3 and is applicable to an inlet opening 36 (FIG. 6) for a rotating shaft 6 in the transmission component 3.

The sealing system 35 comprises: an oil seal ring 2 seated on the inlet opening 36 and configured to receive passing through it, during use, the rotating shaft 6; and an integrated protection component 1, as described above, wherein the annular element 5 with the plug 4 inserted inside it and locked by means of a bayonet joint is inserted inside the sealing ring 2, so that the plug 4 is also inserted inside the sealing ring 2 and, together with the annular element 5 closes, in a substantially fluid-tight or at least dust-tight manner, the opening 36; and wherein the annular element 5 engages by means of sliding friction and slight interference with the sealing lip(s) of the sealing ring 2, causing it to assume elastically a deformed configuration.

As a result, the opening 36 may be effectively closed in a rapid and simple manner, using in fact the plug 4 and the annular element 5 as a single component.

When the transmission component 3 is on the assembly line ready to receive the shaft 6, it is sufficient to remove the plug 4, rotating it by means of the flange 27 so as to free the opening 36 almost entirely, the side wall 8 being relatively thin.

At this point it is sufficient to introduce the shaft 6, inserting it inside the annular element 5; during this movement, the shaft 6 does not come into contact with the sealing ring 2 which is therefore effectively protected from any risk of damage.

Finally, with the shaft 6 in position, an operator merely needs to grip the handle 11 and the lug 28 in order to extract at least partly the annular element 5 from the opening 36, causing it to slide on the shaft 6; also during this movement, the surface 9 protects the sealing ring 2.

Finally, the operator, using only the handle 11, or also the lug 28, exerts on the element 5 a twisting action which breaks the weakened zones 15 and 16 (which are thin or welded), opening the annular element 5 (FIG. 6c) which may thus be removed.

During the steps described, the conicity of the section 24 of the annular side wall allows the shaft 6 to be inserted in a simple manner, even where there is a slight misalignment. The conicity of side surface 9 facilitates the insertion of the annular element 5 inside the sealing ring 2 using little force and without causing any damage.

Finally, the stem 32 allows the insertion of the internal protection component 1 to be guided with precision inside the opening 36.

The solution according to the invention therefore ensures that sealing lip of the sealing ring 2 remains intact during the operation for assembly of the transmission shaft 6 and at the same prevents the accidental entry of any contaminants.

All of the objects of the invention are therefore achieved.

The invention claimed is:

1. An integrated protection component for an oil seal ring for a vehicle transmission component; the integrated component comprising: a plug configured to be inserted inside the sealing ring and an annular element configured to protect the sealing ring during the insertion of a rotating shaft therethrough, the plug defining a plug cross section thereof, the plug cross section being perpendicular to, and centered on, a central axis extending in an axial direction, the plug cross section having a first area; wherein, in combination:
   i) the annular element comprises a first flange-shaped end and a tubular side wall that axially extends projecting from the first end and is configured to directly contact the sealing ring with a radially outer surface of the tubular side wall and to internally receive the rotating shaft along a radially inner surface; and
   a plurality of radial projections located on the outer surface of the tubular side wall, the plurality of radial projections being circumferentially spaced and arranged annularly around the tubular side wall, the plurality of radial projections being configured to engage axially against the sealing ring;
   ii) the flange-shaped end is provided, radially on the outside and radially projecting, with at least a handle and is configured to engage axially, against the sealing ring, the handle comprising an annular gripping ring, the annular gripping ring defining a ring cross section having a second area;
   iii) the plug and the first flange-shaped end are configured to engage together removably by means of a snap-engaging or bayonet joint, with the plug arranged inside the annular element, the plug being able to be inserted into the annular element via the first flanged end;
   iv) the tubular side wall being provided along the whole of its axial length with a first weakened zone formed longitudinally alongside a second, radially formed, weakened zone of the first flange-shaped end; the first and second weakened zones being configured to break following a pulling force exerted manually on the handle to cause the circumferential opening of the annular element;
   wherein the first area and the second area are parallel and do not axially overlap.

2. The integrated protection component according to claim 1, wherein the annular element is made from a single piece of synthetic plastic material.

3. The integrated protection component according to claim 1, wherein the first and second weakened zones are defined by opposite longitudinal adjacent edges of the tubular side wall and radial edges of the first flange-shaped end, which have been welded together, or by thinner portions of the flange-shaped end and the tubular side wall.

4. The integrated protection component according to claim 1, wherein the first flange-shaped end has, in addition to the handle, a lug formed in a position diametrically opposite to the handle and configured to be gripped manually; the handle comprising a flexible tongue formed integrally with the flange-shaped end and terminating in a manual gripping ring.

5. The integrated protection component according to claim 1, wherein the radially outer side surface of the tubular side wall is conical and has a conicity directed towards a second end of the annular element which is situated opposite to the first flange-shaped end.

6. The integrated protection component according to claim 1, wherein the plug is provided with an axial guide stem that extends projecting from the annular element and through the annular element, on the opposite side to the first flange-shaped end of the annular element; the stem being provided with a plurality of radial fins and being configured to be inserted, inside the transmission component.

7. An integrated protection component for an oil seal ring for a vehicle transmission component; the integrated component comprising: a plug configured to be inserted inside the sealing ring and an annular element configured to protect the sealing ring during the insertion of a rotating shaft therethrough; wherein, in combination:
   i) the annular element comprises a first flange-shaped end and a tubular side wall that axially extends projecting from the first end and is configured to directly contact the sealing ring with a radially outer surface of the tubular side wall and to internally receive the rotating shaft along a radially inner surface;
   ii) the flange-shaped end is provided, radially on the outside and radially projecting, with at least a handle and is configured to engage axially, against the sealing ring;
   iii) the plug and the first flange-shaped end are configured to engage together removably by means of a snap-engaging or bayonet joint, with the plug arranged inside the annular element, the plug being able to be inserted into the annular element via the first flanged end;
   iv) the tubular side wall being provided along the whole of its axial length with a first weakened zone formed longitudinally alongside a second, radially formed, weakened zone of the first flange-shaped end; the first and second weakened zones being configured to break following a pulling force exerted manually on the handle to cause the circumferential opening of the annular element,
   wherein the plug is made as one piece from a synthetic plastic material and comprises a cup-shaped head having a concavity directed on the opposite side to the annular element and, on the side where its concavity is located, a flange for engagement with the first flange-shaped end of the annular element; the head of the plug being delimited by: a first section of an annular side wall that is frustoconically shaped and configured to engage with a frustoconically shaped opening of the tubular side wall of the annular element; and a second section of the annular side wall, which is cylindrical shaped and configured to engage with the radially inner side surface of the tubular side wall of the annular element.

8. The integrated protection component according to claim 7, wherein the plug, inside the concavity of the head, is provided with at least one gripping flange for rotating the plug relative to the annular element.

9. The integrated protection component according to claim 7, wherein the first and second weakened zones are defined by opposite longitudinal adjacent edges of the tubular side wall and radial edges of the first flange-shaped end, which have been welded together, or by thinner portions of the flange-shaped end and the tubular side wall.

10. The integrated protection component according to claim 7, wherein the first flange-shaped end has, in addition to the handle, a lug formed in a position diametrically opposite to the handle and configured to be gripped manually; the handle comprising a flexible tongue formed integrally with the flange-shaped end and terminating in a manual gripping ring.

11. The integrated protection component according to claim 7, wherein the plug is provided with an axial guide stem that extends projecting from the annular element and through the annular element, on the opposite side to the first flange-shaped end of the annular element; the stem being provided with a plurality of radial fins and being configured to be inserted, inside the transmission component.

12. An integrated protection component for an oil seal ring for a vehicle transmission component; the integrated component comprising: a plug configured to be inserted inside the sealing ring and an annular element configured to protect the sealing ring during the insertion of a rotating shaft therethrough; wherein, in combination:
   i) the annular element comprises a first flange-shaped end and a tubular side wall that axially extends projecting from the first end and is configured to directly contact the sealing ring with a radially outer surface of the tubular side wall and to internally receive the rotating shaft along a radially inner surface;
   ii) the flange-shaped end is provided, radially on the outside and radially projecting, with at least a handle and is configured to engage axially, against the sealing ring;
   iii) the plug and the first flange-shaped end are configured to engage together removably by means of a snap-engaging or bayonet joint, with the plug arranged inside the annular element, the plug being able to be inserted into the annular element via the first flanged end;
   iv) the tubular side wall being provided along the whole of its axial length with a first weakened zone formed longitudinally alongside a second, radially formed, weakened zone of the first flange-shaped end; the first and second weakened zones being configured to break following a pulling force exerted manually on the handle to cause the circumferential opening of the annular element,
   wherein the first flange-shaped end is provided, on the side where the tubular side wall is located, with a plurality of radial projections that are circumferentially spaced from each other and arranged annularly and are configured to engage axially, against the sealing ring.

13. The integrated protection component according to claim 12, wherein the annular element is made from a single piece of synthetic plastic material.

14. The integrated protection component according to claim 12, wherein the first and second weakened zones are defined by opposite longitudinal adjacent edges of the tubular side wall and radial edges of the first flange-shaped end, which have been welded together, or by thinner portions of the flange-shaped end and the tubular side wall.

15. The integrated protection component according to claim 12, wherein the first flange-shaped end has, in addition to the handle, a lug formed in a position diametrically opposite to the handle and configured to be gripped manually; the handle comprising a flexible tongue formed integrally with the flange-shaped end and terminating in a manual gripping ring.

16. The integrated protection component according to claim 12, wherein the radially outer side surface of the tubular side wall is conical and has a conicity directed towards a second end of the annular element which is situated opposite to the first flange-shaped end.

* * * * *